United States Patent
Wise et al.

[15] 3,678,634
[45] July 25, 1972

[54] FIRE ISOLATION AND INSULATING APPARATUS

[72] Inventors: Eugene H. Wise, Saugus; James J. Blumenkranz, Hollywood, both of Calif.

[73] Assignee: R & G Sloane Manufacturing Company, Inc., Los Angeles, Calif.

[22] Filed: Aug. 4, 1970

[21] Appl. No.: 61,253

[52] U.S. Cl. ..................................52/1, 49/428, 52/220, 137/77, 251/7, 52/173, 52/232
[51] Int. Cl. .....................................F16k 13/00, F16k 17/00
[58] Field of Search ...............52/1, 113, 220, 173; 220/88 R; 160/5, 235; 248/5; 137/356, 357, 77, 75, 68; 83/320; 251/326, 147, 203, 299, 300, 7, 9; 49/5, 428; 138/94, 94.3

[56] References Cited

UNITED STATES PATENTS

| | | | |
|---|---|---|---|
| 3,426,539 | 2/1969 | Whear | 251/7 |
| 3,487,419 | 12/1969 | Heyerly | 52/1 |
| 727,854 | 5/1903 | Simpson | 49/5 |
| 2,990,979 | 7/1961 | Harrison et al. | 251/9 |
| 2,711,866 | 6/1955 | Bentz | 248/5 |
| 469,005 | 2/1892 | Anderson | 52/220 |
| 2,643,848 | 6/1953 | Hoffman | 251/7 |
| 2,729,971 | 1/1956 | Stein | 251/7 |
| 1,238,521 | 8/1917 | Janish, Jr. | 251/7 |
| 2,185,733 | 1/1940 | Kaufman | 251/7 |
| 2,112,625 | 3/1938 | Jackson | 251/9 |
| 1,417,117 | 5/1922 | Tyler | 83/320 |
| 648,128 | 4/1900 | Kinniburgh | 137/356 |

FOREIGN PATENTS OR APPLICATIONS

| | | | |
|---|---|---|---|
| 579,721 | 7/1959 | Canada | 52/220 |
| 1,077,932 | 3/1960 | Germany | 251/9 |

*Primary Examiner*—Frank L. Abbott
*Assistant Examiner*—Leslie A. Braun
*Attorney*—Tipton D. Jennings

[57] ABSTRACT

Apparatus for closing off and insulating a plastic article such as a pipe section extending through a fire-resistant wall or floor to prevent the spread of fire by the progressive burning of the pipe section. The apparatus generally includes a slidably movable gate, preferably metal, which seals the walls of the plastic pipe section to interrupt it when it softens in the presence of fire and before it ignites, and baffle or screen the pipe section, thereby insuring against the spread of fire via the pipe section, such as from the hot side to the cold side of the fire-resistant wall or floor. Such apparatus may be installed on either or both sides of the wall or floor through which the plastic pipe section passes.

17 Claims, 10 Drawing Figures

Patented July 25, 1972

INVENTOR
EUGENE H. WISE
JAMES J. BLUMENKRANZ

BY Martha L. Ross
AGENT

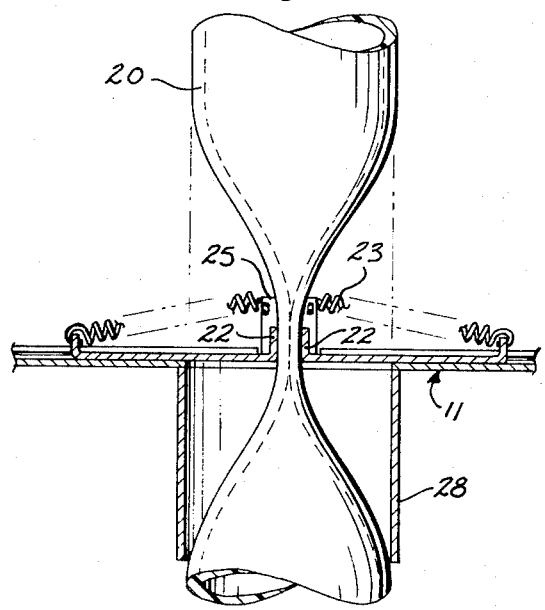
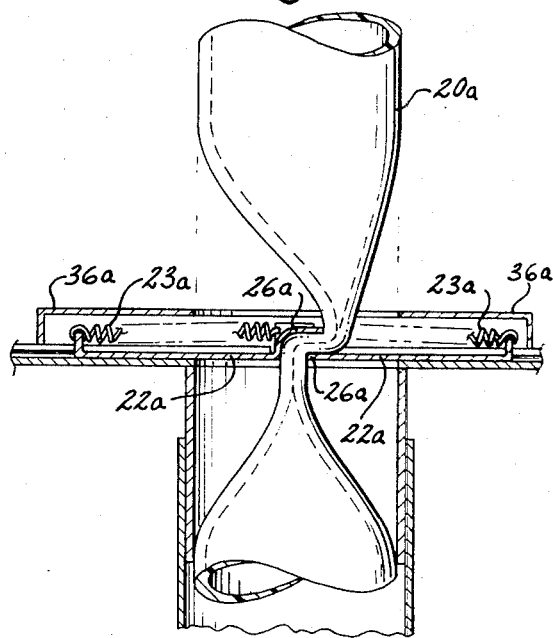
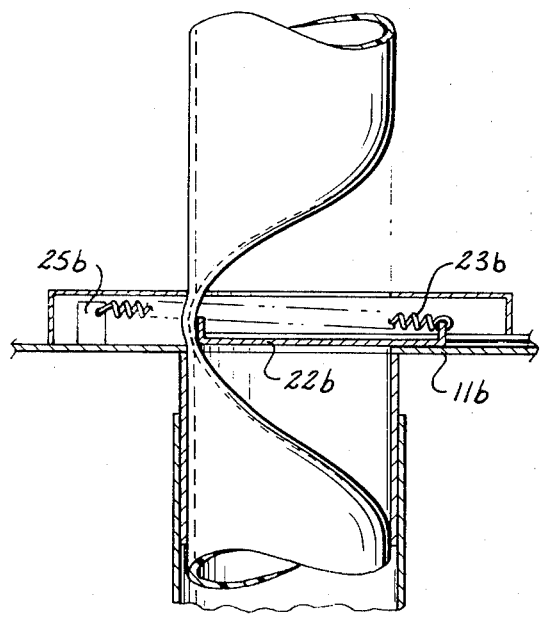
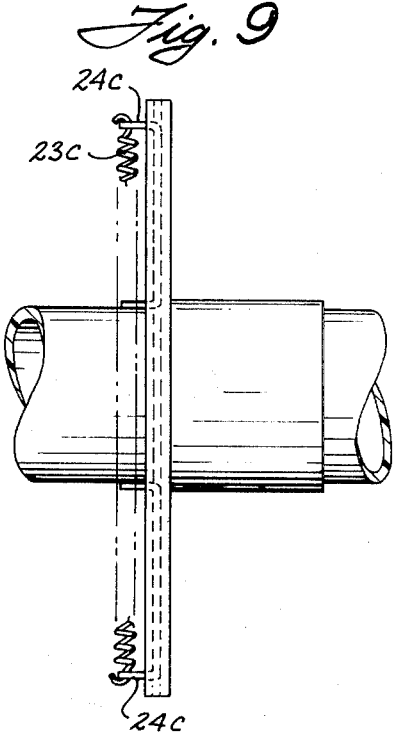

FIRE ISOLATION AND INSULATING APPARATUS

BACKGROUND AND SUMMARY OF THE INVENTION

This invention relates to apparatus for preventing the spread of fire by the progressive burning of a plastic article or assembly such as a pipe system and, more particularly, to apparatus which is adapted to seal the walls of a plastic pipe system to interrupt and baffle it when it softens in the presence of fire and before it ignites, to insure against the progressive burning of the pipe system through a fire-resistant wall or floor.

One problem that has occurred recently with plastic pipe systems made of thermoplastic materials, such as polyethylene or polypropylene has been the possibility of transmission of fire through a fire-resistant wall or floor in a building by the progressive burning of a plastic pipe system extending through the wall or floor. A few approaches have been suggested for solving this problem. One approach involves the use of plastic pipe and fittings of a self-extinguishing material, such as polyvinylchloride (PVC), that is less flammable than the polypropylene or other plastic materials sometimes used for the piping system. Pipe and fittings of PVC are used for the portion of the pipe system extending through the fire-resistant wall or floor to thus curb the spread of fire via the pipe system from one side of the wall or floor to the other. While this approach may be successful under some circumstances in preventing the spread of fire by the progressive burning of plastic pipe and fittings, it is unlikely to be effective in an intense fire as even the self-extinguishing plastics will burn in such a situation and will leave a hole in the wall or floor through which the fire may be transmitted. Another approach is to insulate the thermoplastic pipe system with a thick layer of high-temperature insulation to prevent thereby the burning of the pipe system in the presence of fire. This approach, however, is very time-consuming and expensive. Still another approach is described in U.S. Pat. No. 3,462,890 to Blumenkranz et al., in which an insulated gate apparatus is provided for severing the pipe section as it softens in the presence of fire and before it ignites.

By the present invention there is provided apparatus which prevents the spread of fire by the progressive burning of a plastic pipe system, by sealing off the walls of the pipe system when it softens in the presence of fire and by screening or baffling the pipe or tubing opening into the fire area. The pipe section may be sealed off by the compressing action of one or more gate members or, in another embodiment, the walls of the pipe section are severed by the gate member. The subject apparatus includes a frame which may be easily mounted on or within the wall or floor of a building, with an aperture in the frame to accommodate a section of a plastic piping system extending through the wall or floor. One or a pair of metal gate members are slidably mounted on the frame, and are urged by a spring or other biasing means in a direction for compressing or severing the walls of the adjacent plastic pipe section when the pipe section softens in the presence of fire and before it ignites. In this manner the pipe system is sealed at the wall or floor by the fire resistant gate members, thereby insuring against the spread of fire through the wall passageway by the progressive burning of the pipe section. Drafts normally caused by open ended burning through plastic pipe or tubing are eliminated. When the gate member on the hot side of the wall has closed, that part of the plastic pipe remaining inside the wall passage can act as an additional barrier against further transfer of flame and heat through the wall.

Referring to the drawings:

FIG. 6 is a cross-sectional view of the subject apparatus in the single configuration shown with the plastic pipe in its closed or compressed position after the pipe has been softened by fire or heat;

FIG. 7 is a cross-sectional view of a first modification of the subject apparatus;

FIG. 8 is a cross-sectional view of a second modification of the subject apparatus;

FIG. 9 is a side elevational view of a third modification of the subject apparatus.

DESCRIPTION OF THE PREFERRED EMBODIMENTS

Figure 1:
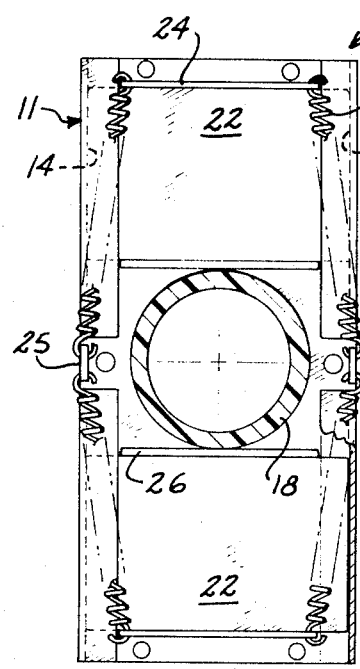
FIG. 1 is a front elevational view of apparatus constructed according to the principles of the present invention, and showing the gate members in operative position wherein they are adapted to compress the adjacent walls of the plastic pipe system in the event the walls are softened by fire.
Figure 2:
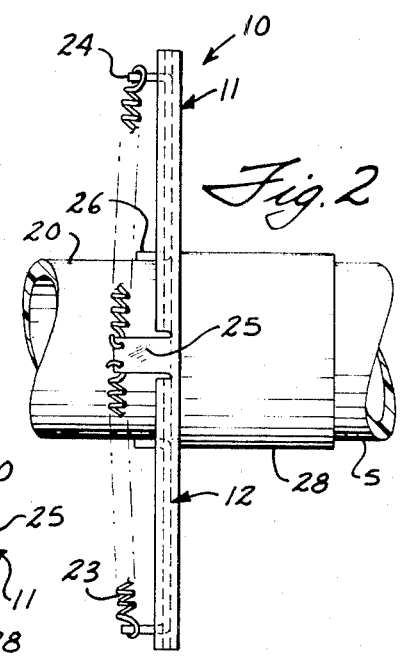
FIG. 2 is a side elevational view of the apparatus shown in FIG. 1.
Figure 3:
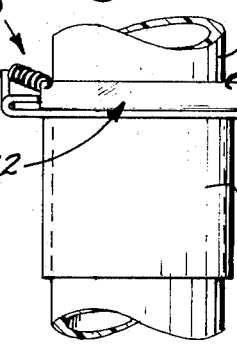
FIG. 3 is a bottom elevational view of the apparatus shown in FIG. 1.

In the illustrated embodiment of the present invention as shown in FIGS. 1, 2 and 3, apparatus 10 is provided for preventing the spread of fire by the progressive burning of a plastic pipe system. The apparatus includes a frame 11, formed of any suitable metallic or similar material, having elongated side walls 12, each of which has a substantially longitudinally extending guide slot 14 therein. The frame 11 is provided at its center portion with a circular aperture 18 that is adapted to receive therethrough a pipe section 20 which forms part of a plastic piping system (not shown).

Gate members 22 are disposed in the open position above and below the aperture 18 in the frame 11 and are slidably mounted on the side walls 12 for longitudinal movement in the slots 14. The gate members 22 comprise plates formed of steel or other suitable metal. The gates are free to slide back and forth but are urged toward the center aperture by springs 23. These springs 23 are secured to the gates at gate tabs 24 and tensioned against frame tabs 25. The edges 26 of the gates which bear upon the plastic pipe may have blunt or turned-over surfaces (as shown). Attached to the back of the frame 11 are connecting sections of pipe or tubing 28 of metal or other fire resistant material sized to receive the pipe section 20 and whose function is to prevent the spread of fire into the wall or floor structure, should fire occur in the pipe section within the wall or floor.

In use, the frame 11 may be rigidly mounted in any suitable manner on or within a fire-resistant wall or floor through which the section 20 of a plastic piping system passes. The section 28 of frame 11 fits within the piping passageway formed in the wall or floor. The edges 26 of the gates rest upon the outer surface of the plastic pipe section 20 and are urged against the pipe by the springs 23. At normal ambient temperatures, the plastic pipe section 20 is sufficiently hard to resist the compressive force of gates 22.

As an illustrative example, the pipe system including the pipe section 20 may be formed of a thermoplastic material such as polypropylene which, depending on the characteristics of the polymer used, has a softening point of approximately 350° F., a melting point of approximately 400° F., and an ignition point of approximately 800° to 850° F. In the presence of fire, therefore, polypropylene and other thermoplastic pipe will soften long before it ignites. This feature of such plastic pipe is utilized in the operation of the instant apparatus.

Figure 4:
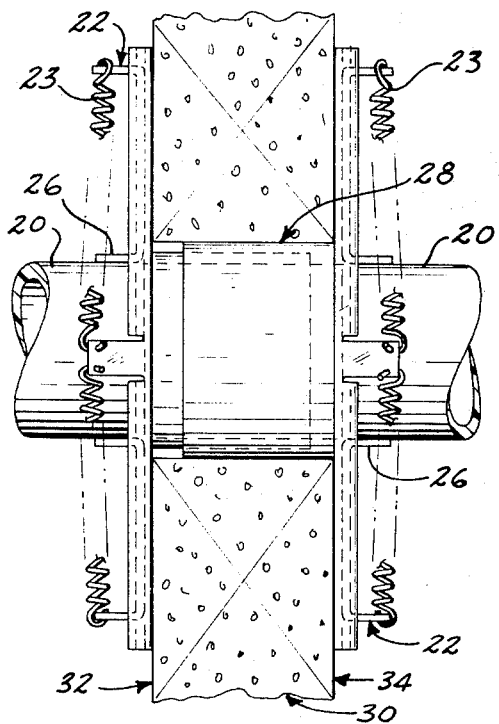
FIG. 4 is a side elevational view of the subject apparatus installed in a wall or floor in the dual-configuration.
Figure 5:
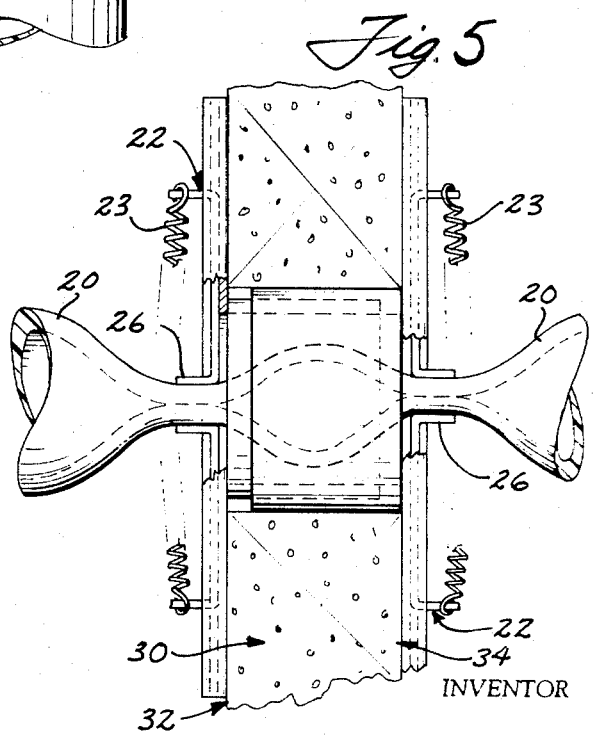
FIG. 5 is a side elevational view of the subject apparatus installed in a wall or floor in a dual-configuration with the plastic pipe in its closed or compressed position after the pipe has been softened by fire or heat.

In FIGS. 4 and 5 there is shown an installation of the apparatus of FIG. 1 in a wall or floor 30, in which the apparatus is installed on both sides of the wall or floor. The connecting pipes 28 attached to the back of each apparatus are telescoped with one pipe overlapping the other to effectively channel the heat or fire within the plastic pipe system and avoid the spreading of fire inside the wall or floor. The connecting pipes, together with the gate members when closed, form an enclosed space which acts as a heat insulating medium to prevent the spread of fire or heat through the wall or floor. In operation, if a fire occurs on one side of a fire-resistant wall within which the apparatus is installed, the portion of the pipe section 20 exposed to the fire begins to soften when the ambient temperature reaches approximately the softening point of the plastic or at approximately 350° F. in the case of polypropylene. As the pipe section 20 softens, the pressure exerted by the springs 23 on the gate members 22 causes the edges 26 of the gate members to begin to compress the walls of the pipe section 20. When the pipe section softens sufficiently in the presence of fire, the pressure exerted upon the outer walls of the pipe section by the gate members is sufficient to close completely the opening in the pipe, at a point between the edges 26 of the gate members 22, through the controlled movement of the gate members in the guide slots 14 of the side walls 12. If the fire is intense, heat will be conducted from the hot side 32 through the plastic pipe to the cold side 34 of the wall or floor, thus softening the section of pipe immediately adjacent to the installation of the apparatus on the cold side 34 of the wall or floor. The pressure of the springs 23 upon the gate members 22 on the cold side of the wall or floor will cause the gates to compress the walls of the pipe section, as shown in FIG. 5, thus effectively and preventing transfer of the fire through the plastic pipe system. In FIG. 6 there is shown a cross-sectional view of the apparatus in a single-frame embodiment with the softened walls of the pipe section 20 compressed together by the gate members 22.

FIGS. 7 through 10 disclose modified forms of the subject apparatus that are suitable for mounting on or within a fire-resistant wall or floor to prevent the spread of fire by the progressive burning of a plastic pipe system extending therethrough. In the apparatus as shown in FIG. 7, the edges 26a of the gate members 22a are shaped so that the edge of one member rides over the edge of the other member with space between for the softened plastic pipe section 20a to be both compressed and deflected. The fold in the softened pipe section which is thus created acts as an additional barrier against the transfer of flame and heat. The embodiment of FIG. 7 is also shown with the springs 23a covered by a metal enclosure 36a to protect the gate-actuating mechanism against damage by fire or heat. These spring enclosures may also be constructed of an insulating-type material to provide additional heat protection for the springs. The apparatus of FIG. 8 is shown with a single gate member 22b design with the spring 23b on each side of the frame 11b being attached to a single frame tab 25b. In the apparatus shown in FIG. 9, the frame tabs have been eliminated so that the ends of the longitudinal springs 23c are attached to the corresponding gate tabs 24c on each side of the frame.

Figure 10:
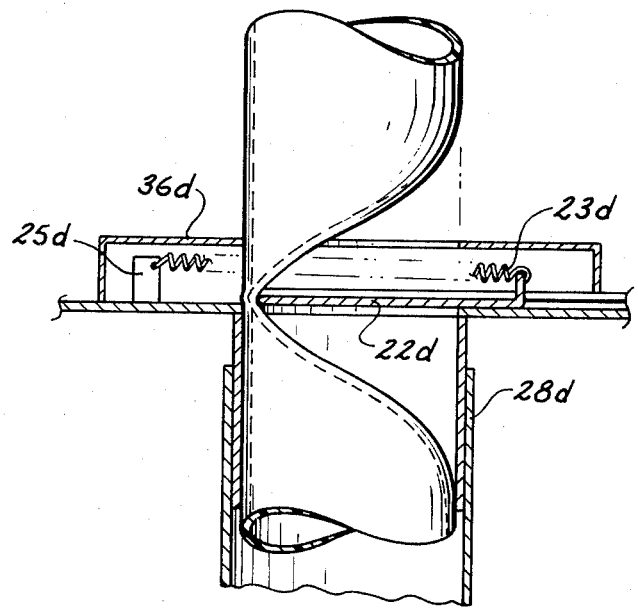
FIG. 10 is a cross-sectional view of a fourth modification of the subject apparatus, similar to that shown in FIG. 8, but differing in the configuration of the sliding gate member.

In FIG. 10, there is shown an embodiment in which the single gate member 22d of the apparatus is provided with a blade edge for use in severing the plastic pipe as it is softened in the presence of fire. Once the blade edge severs the plastic pipe, the opening through the wall or floor is completely closed by virtue of the gate member 22d covering the circular aperture formed in the frame. The spring 23d on each side of the apparatus is attached to a single frame tab 25d and is covered by a metal enclosure 36d to protect the spring from the heat which can result in annealing of the springs. In this embodiment, the steel gate member 22d on each side of the wall or floor can be used in conjunction with the connecting pipes 28d which are channeled through the wall or floor such that within the wall or floor there is created an air space which acts as a heat insulating medium to prevent the spread of fire through the wall or floor, such as by ignition due to heat emanating from the gate member located on the hot side of the wall.

From the foregoing description, it is apparent that the subject apparatus may be used to prevent the progressive burning of any appropriate type of article or assembly, other than a pipe system, formed of a thermoplastic material.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. In combination, a normally-rigid thermoplastic pipe section and apparatus for preventing the progressive burning of the pipe section, said apparatus comprising:
   a. a frame having an aperture through which the pipe section extends,
   b. a pair of gate members, each having a blunt edge thereon and movably mounted on said frame for movement from a first position exterior of the pipe section periphery to a second position in sealing engagement with the pipe section, and
   c. means for moving each of the gate members from said first position to said second position, whereby when the pipe section is softened in the presence of fire, said means causes each of the gate members to compress the walls of the pipe section and move to said second position.

2. The combination of claim 1 wherein the means for moving each of the gate members comprises at least one spring connected to said gate member and urging it toward said second position.

3. The combination of claim 2 further comprising a fire-resistant enclosure mounted on said frame and covering said at least one spring.

4. The combination of claim 2 wherein one apparatus for preventing the burning of the pipe section is located on each side of a wall or floor through which the pipe section passes.

5. The combination of claim 4 further comprising a fire-resistant enclosure mounted on said frame and covering said at least one spring.

6. The combination of claim 5 further comprising a connecting pipe attached to the back of each frame in alignment with the frame aperture, both of said connecting pipes extending into the wall or floor to form a cylindrical space through which the thermoplastic pipe section passes.

7. The combination of claim 6 wherein the edge of one gate member is offset with respect to the other gate member such that the one gate member rides over the edge of the other gate member as the gate members move to said second position, so that the softened pipe section is both compressed and deflected.

8. The combination of claim 1 wherein the edge of one gate member is offset with respect to the other gate member such that the one gate member rides over the edge of the other gate member as the gate members move to said second position, so that the softened pipe section is both compressed and deflected.

9. In combination, a normally-rigid thermoplastic pipe section and apparatus for preventing the progressive burning of the pipe section, said apparatus comprising:
   a. a pair of frames, each frame having an aperture through which the pipe section extends,
   b. a pair of metal gate members, each gate member having a blade edge thereon, and being movably mounted on a respective one of said frames for movement from a first position exterior of the pipe section periphery to a second position covering said aperture, and
   c. means for moving each of said gate members from said first position to said second position, whereby when said pipe section is softened in the presence of fire, said means causes said gate member to cut through and sever said pipe section and move to said second position.

10. The combination of claim 9 wherein the means for moving each of the gate members comprises at least one spring connected to the gate member and urging it toward the second position.

11. The combination of claim 10 further comprising a fire-resistant enclosure mounted on each of said frames and covering the respective said at least one spring.

12. Apparatus for preventing the progressive burning of a pipe system formed of thermoplastic material comprising:

a. a pair of frames, each frame having an aperture through which a section of the pipe system can pass,
b. a connecting pipe attached to each frame in alignment with the frame aperture and forming a cylindrical space through which the pipe section can pass,
c. a pair of gate members, each gate member having a blade edge thereon, and being movably mounted on a respective one of said frames for movement from a first position exterior of the pipe section periphery to a second position covering said aperture, and
d. means for moving each of said gate members from said first position to said second position, whereby when said pipe section is softened in the presence of fire, said means causes said gate member to cut through and sever said pipe section and move to said second position.

13. The apparatus of claim 12 wherein the means for moving each of the gate members comprises at least one spring connected to the gate member and urging it toward the second position.

14. The apparatus of claim 13 further comprising a fire-resistant enclosure mounted on each of said frames and covering the respective said at least one spring.

15. Apparatus for preventing the progressive burning of a pipe system formed of thermoplastic material, comprising:
a. a frame having an aperture designed to receive a section of pipe,
b. means, mounted on said frame for movement transversely across said aperture, for compressing the section of pipe when said section softens in the presence of fire, and
c. at least one spring connected to said compressing means, said spring positioned to bias said compressing means against the pipe section such that the pipe section becomes compressed and closed, when it sufficiently softens in the presence of fire, by the transverse movement of the compressing means.

16. The combination of claim 15 further comprising a pipe-shaped member connected to said frame in alignment with said aperture, said pipe-shaped member extending outwardly from said frame and designed to receive said pipe section.

17. The combination of claim 16 further comprising a fire resistant enclosure mounted on said frame and covering said at least one spring.

* * * * *